Patented July 6, 1943

2,323,710

UNITED STATES PATENT OFFICE 2,323,710

PRINTING INK

Donald Robert Erickson and Paul J. Thoma, Kalamazoo, Mich., assignors to Michigan Research Laboratories, Inc., Kalamazoo, Mich.

No Drawing. Application June 2, 1941,
Serial No. 396,300

2 Claims. (Cl. 106—30)

This invention relates to improvements in printing ink.

This invention relates to printing ink. It relates particularly to inks using a varnish comprising a solvent and a binder which is soluble in a solvent or the solvent and a limited quantity of water, but not soluble in the solvent and more than a limited quantity of water. Such inks are particularly desirable because they will stay open on the press during periods of high humidity, but they can be treated with water, for example steam or a water spray, after printing to separate some of the binder from the solvent at the surface of the printed film to prevent offset.

The objects of this invention are:

First, to provide a new and improved printing ink.

Second, to provide such an ink of the type above referred to, the printed film of which is hard and highly scuff, rub and smudge resistant.

Third, to provide such an ink which may be made inexpensively with shellac forming part of the binder.

Other objects and advantages pertaining to details and economies will appear from the description to follow.

We have found that if shellac is used in solution in a liquid polyglycol, it gives desirable qualities to the printed film of ink but the solution of shellac does not have the necessary water tolerance for use when high humidities are encountered. High humidities will separate the shellac from the solvent, causing the ink to set up on the press.

We have found, however, that if with shellac we use a resin comprising a rosin or a terpene hydrocarbon of the formula C10H16 modified by an alpha beta unsaturated organic polybasic acid such as maleic or fumaric in a polyglycol as a solvent for a varnish, the ink will have sufficient water tolerance to prevent separation of the shellac, even when high humidity conditions are encountered.

It is possible by treating with steam or water sprays to prevent offset by separating the binder of the ink from the solvent at the surface of the printed film. The ink has highly desirable properties in that it adheres extremely well and therefore has better rub, smudge and scuff resistance than is encountered in inks of this type generally.

We have found that a resin comprising a rosin modified by an alpha beta unsaturated organic polybasic acid which is sold on the market under the trade name "Teglac 127" is satisfactory.

The terpene hydrocarbon of the formula C10H16 modified by an alpha beta unsaturated organic polybasic acid can be obtained on the open market under the trade name "Petrex acid."

Inks may be made with a suitable pigment and either of the following varnishes:

|   | Parts by weight |
|---|---|
| 1. Diethylene glycol | 50 |
| "Teglac 127" | 40 |
| Shellac | 10 |
| 2. Diethylene glycol | 50 |
| "Petrex acid" | 40 |
| Shellac | 10 |

If "Teglac 127" and "Petrex acid" are mixed to make up the 40 parts represented by either the "Teglac 127" or the "Petrex acid" in the above examples, satisfactory results are obtained.

The terms and expressions which have been herein employed are used as terms of description and not of limitation and there is no intention in the use of such terms and expressions of excluding any equivalents of the features shown and described. It is recognized that various modifications are possible within the scope of the invention claimed.

Having thus described our invention, what we claim as new and desire to secure by Letters Patent is:

1. A non-offset printing ink comprising a varnish comprising 50 parts by weight of liquid polyglycol as a solvent for the binder and as a binder, 40 parts by weight of a resin selected from the group consisting of rosin modified by an alpha beta unsaturated organic acid and a terpene hydrocarbon of the formula C10H16 modified by an alpha beta unsaturated organic polybasic acid, and 10 parts by weight of shellac, said binder being adapted to form when subjected to steam immediately after printing a thin hard film of binder over the exposed surface of the printed film, and a pigment.

2. A non-offset printing ink comprising a varnish stable against separation of the binder at high atmospheric humidity conditions comprising liquid polyglycol as a solvent for the binder and a binder comprising resin selected from the group consisting of rosin modified by an alpha beta unsaturated organic acid and a terpene hydrocarbon of the formula C10H16 modified by an alpha beta unsaturated organic polybasic acid, mixed with shellac, said binder being in sufficient amount to form when subjected to steam immediately after printing a thin hard film of binder over the exposed surface of the printed film, and a pigment.

DONALD ROBERT ERICKSON.
PAUL J. THOMA.